United States Patent
Yamada

(10) Patent No.: US 12,008,305 B2
(45) Date of Patent: Jun. 11, 2024

(54) LEARNING DEVICE, EXTRACTION DEVICE, AND LEARNING METHOD FOR TAGGING DESCRIPTION PORTIONS IN A DOCUMENT

(71) Applicant: Nippon Telegraph and Telephone Corporation, Tokyo (JP)

(72) Inventor: Takeshi Yamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 559 days.

(21) Appl. No.: 17/272,700

(22) PCT Filed: Sep. 4, 2019

(86) PCT No.: PCT/JP2019/034864
§ 371 (c)(1),
(2) Date: Mar. 2, 2021

(87) PCT Pub. No.: WO2020/059506
PCT Pub. Date: Mar. 26, 2020

(65) Prior Publication Data
US 2021/0342521 A1  Nov. 4, 2021

(30) Foreign Application Priority Data
Sep. 19, 2018  (JP) ................................ 2018-174531

(51) Int. Cl.
| | | |
|---|---|---|
| G06F 40/117 | (2020.01) | |
| G06F 40/216 | (2020.01) | |
| G06F 40/279 | (2020.01) | |
| G06N 20/00 | (2019.01) | |

(52) U.S. Cl.
CPC .......... *G06F 40/117* (2020.01); *G06F 40/216* (2020.01); *G06F 40/279* (2020.01); *G06N 20/00* (2019.01)

(58) Field of Classification Search
CPC .... G06F 40/117; G06F 40/216; G06F 40/279; G06N 20/00; G06N 7/01
See application file for complete search history.

(56) References Cited

U.S. PATENT DOCUMENTS

| | | | | |
|---|---|---|---|---|
| 2010/0100537 A1* | 4/2010 | Druzgalski | ......... | H04L 12/1859 |
| | | | | 707/750 |
| 2011/0113047 A1* | 5/2011 | Guardalben | ......... | G06Q 10/101 |
| | | | | 707/754 |

(Continued)

FOREIGN PATENT DOCUMENTS

JP   2018-18373   2/2018

*Primary Examiner* — Michael N Opsasnick
(74) *Attorney, Agent, or Firm* — Fish & Richardson P.C.

(57) ABSTRACT

An extraction apparatus includes: a pre-processing unit configured to perform, on training data that is data described in natural language and in which a tag has been provided to an important description portion in advance, pre-processing for calculating an information gain that indicates a degree of relevance to the tag for each word and deleting a description portion with low relevance to the tag from the training data based on the information gain of each word; and a learning unit configured to learn the pre-processed training data and generate a list of conditional probabilities relating to the tagged description portion.

5 Claims, 15 Drawing Sheets

(56) References Cited

U.S. PATENT DOCUMENTS

| | | | |
|---|---|---|---|
| 2011/0257961 A1* | 10/2011 | Tinkler | G09B 7/06 |
| | | | 434/156 |
| 2013/0149681 A1* | 6/2013 | Tinkler | G09B 19/00 |
| | | | 434/167 |
| 2014/0122117 A1* | 5/2014 | Masarie, Jr. | G16H 70/20 |
| | | | 705/3 |
| 2017/0013429 A1* | 1/2017 | Marti | H04W 4/029 |
| 2017/0083547 A1* | 3/2017 | Tonkin | G06F 16/23 |
| 2017/0185674 A1* | 6/2017 | Tonkin | G06F 16/328 |

\* cited by examiner

LEARNING DEVICE, EXTRACTION DEVICE, AND LEARNING METHOD FOR TAGGING DESCRIPTION PORTIONS IN A DOCUMENT

CROSS-REFERENCE TO RELATED APPLICATIONS

This application is a National Stage application under 35 U.S.C. § 371 of International Application No. PCT/JP2019/034864, having an International Filing Date of Sep. 4, 2019, which claims priority to Japanese Application Serial No. 2018-174531, filed on Sep. 19, 2018. The disclosure of the prior application is considered part of the disclosure of this application, and is incorporated in its entirety into this application.

TECHNICAL FIELD

The present invention relates to a learning apparatus, an extraction apparatus, and a learning method.

BACKGROUND ART

Conventionally, in a software development process, test items in unit testing, integration testing, and multiple composite testing/stability testing are extracted manually by a skilled person based on a design specification generated in system design/basic design, functional design, and detailed design. In contrast to this, an extraction method of automatically extracting test items of a testing step from a design specification, which is often written in natural language, has been proposed (see PTL 1).

In this extraction method, training data obtained by tagging important description portions of a design specification written in natural language is prepared, and the trend of the tagged description portions is learned using a machine learning logic (e.g., CRF (Conditional Random Fields)). Then, in this extraction method, based on the learning result, a new design specification is tagged using a machine learning logic, and the test items are extracted in a mechanical manner from the tagged design specification.

CITATION LIST

Patent Literature

[PTL 1] Japanese Patent Application Publication No. 2018-018373

SUMMARY OF THE INVENTION

Technical Problem

In the conventional extraction method, an attempt was made to improve the accuracy of machine learning for extracting test items by preparing as many related natural language documents as possible and increasing the amount of training data. However, training data includes description portions that are unrelated to the tag, in addition to the description portions to be tagged. For this reason, in the conventional extraction method, there have been limitations on the improvement of the accuracy of machine learning since the probability calculation for the description portions that are unrelated to the tag is also reflected during learning of the training data. As a result, in the conventional extraction method, there have been cases in which it is difficult to efficiently extract test items from test data such as a design specification in a software development process.

The present invention was made in view of the foregoing circumstances, and aims to provide a learning apparatus, an extraction apparatus, and a learning method, according to which it is possible to efficiently learn tagged portions in a software development process.

Means for Solving the Problem

In order to solve the above-described problems and achieve the object, a learning apparatus according to the present invention includes: a pre-processing unit configured to perform, on training data that is data described in natural language and in which a tag has been provided to an important description portion in advance, pre-processing for calculating an information gain that indicates a degree of relevance to the tag for each word and deleting a description portion with low relevance to the tag from the training data based on the information gain of each word; and a learning unit configured to learn the pre-processed training data and generate a list of conditional probabilities relating to the tagged description portion.

Effects of the Invention

According to the present invention, it is possible to efficiently learn tagged portions in a software development process.

DESCRIPTION OF EMBODIMENTS

Figure 1:
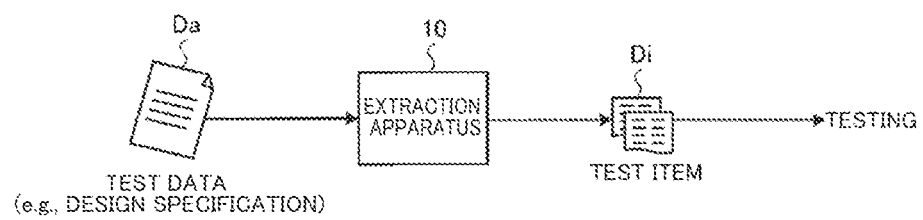
FIG. 1 is a schematic diagram illustrating an overview of processing performed by an extraction apparatus according to an embodiment.

Hereinafter, one embodiment of the present invention will be described in detail with reference to the drawings. Note that the present invention is not limited by the embodiment. Also, identical portions are denoted by identical reference numerals in the description of the drawings.

Embodiment

Regarding an extraction apparatus according to an embodiment, a schematic configuration of the extraction apparatus, a flow of processing of the extraction apparatus, and a specific example of the processing will be described.

FIG. 1 is a schematic diagram illustrating an overview of processing performed by an extraction apparatus according to an embodiment. As illustrated in FIG. 1, in the software development process, an extraction apparatus 10 according to the embodiment extracts test item data Di of testing from description content of test data Da and outputs the extracted test item data Di. The test data Da is a specification, a design specification, or the like that is generated in system design/basic design, functional design, and detailed design. Then, testing such as unit testing, integration testing, and multiple composite testing/stability testing is carried out in accordance with the test items extracted by the extraction apparatus 10.

Overview of Extraction Apparatus

Figure 2:
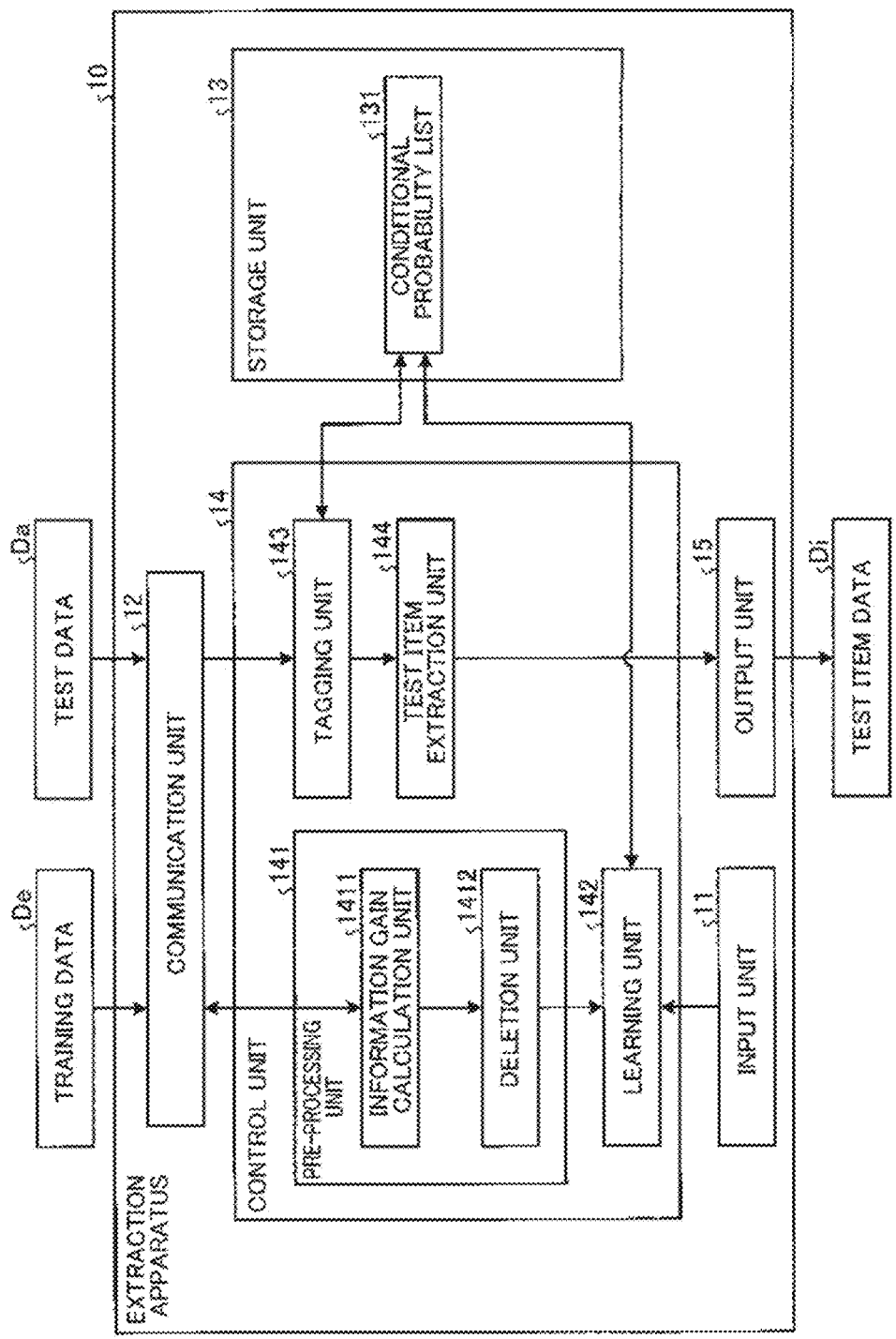
FIG. 2 is a diagram illustrating an example of a configuration of an extraction apparatus according to an embodiment.

Next, a configuration of the extraction apparatus 10 will be described. FIG. 2 is a diagram illustrating an example of a configuration of the extraction apparatus according to the embodiment. The extraction apparatus 10 is realized by, for example, a general-purpose computer such as a personal computer, and as shown in FIG. 2, includes an input unit 11, a communication unit 12, a storage unit 13, a control unit 14, and an output unit 15.

The input unit 11 is an input interface for receiving various operations from an operator of the extraction apparatus 10. For example, the input unit 11 is constituted by an input device such as a touch panel, an audio input device, a keyboard, or a mouse.

The communication unit 12 is a communication interface for transmitting and receiving various types of information to and from another apparatus connected via a network or the like. The communication unit 12 is realized by an NIC (Network Interface Card) or the like, and performs communication between another apparatus and the control unit 14 (described later) via an electrical communication line such as a LAN (Local Area Network) or the Internet. For example, the communication unit 12 inputs training data De, which is data written in a natural language (e.g., a design specification) and in which important description portions have been tagged, to the control unit 14. Also, the communication unit 12 inputs the test data Da from which the test items are to be extracted to the control unit 14.

Note that the tag is, for example, Agent (Target system), Input (input information), Input condition (complementary information), Condition (Condition information of system), Output (output information), Output condition (complementary information), or Check point (check point).

The storage unit 13 is a storage apparatus such as an HDD (Hard Disk Drive), an SSD (Solid State Drive), or an optical disc. Note that the storage unit 13 may also be a data-rewritable semiconductor memory such as a RAM (Random Access Memory), a flash memory, or an NVSRAM (Non Volatile Static Random Access Memory). The storage unit 13 stores an OS (Operating System) and various programs to be executed by the extraction apparatus 10.

Furthermore, the storage unit 13 stores various types of information to be used in the execution of the programs. The storage unit 13 includes a conditional probability list 131 relating to the tagged description portions. The conditional probability list 131 is obtained by associating the type of the assigned tag and the assigned probability with the front-rear relationship and context of each word. The conditional probability list 131 is generated due to the description portions in which tags are present being statistically learned by the learning unit 142 (described later) based on the training data.

The control unit 14 performs overall control of the extraction apparatus 10. The control unit 14 is, for example, an electronic circuit such as a CPU (Central Processing Unit) or an MPU (Micro Processing Unit), or an integrated circuit such as an ASIC (Application Specific Integrated Circuit) or an FPGA (Field Programmable Gate Array). Also, the control unit 14 includes an internal memory for storing programs and control data defining various processing procedures, and executes processing using the internal memory. Also, the control unit 14 functions as various processing units due to various programs operating. The control unit 14 includes a pre-processing unit 141, a learning unit 142, a tagging unit 143, and a test item extraction unit 144 (extraction unit).

The pre-processing unit 141 performs pre-processing for deleting description portions with low relevance to the tags from the input training data De. The pre-processing unit 141 deletes the description portions with low relevance to the tags from the training data De based on the information gain of each word in the training data De. The pre-processing unit 141 includes an information gain calculation unit 1411 and a deletion unit 1412.

The information gain calculation unit 1411 calculates, for each word, an information gain indicating the degree of relevance to the tag in the training data De. Based on the information gain of each word calculated by the information gain calculation unit 1411, the deletion unit 1412 obtains the description portions with low relevance to the tags and deletes them from the training data De.

Figure 3:
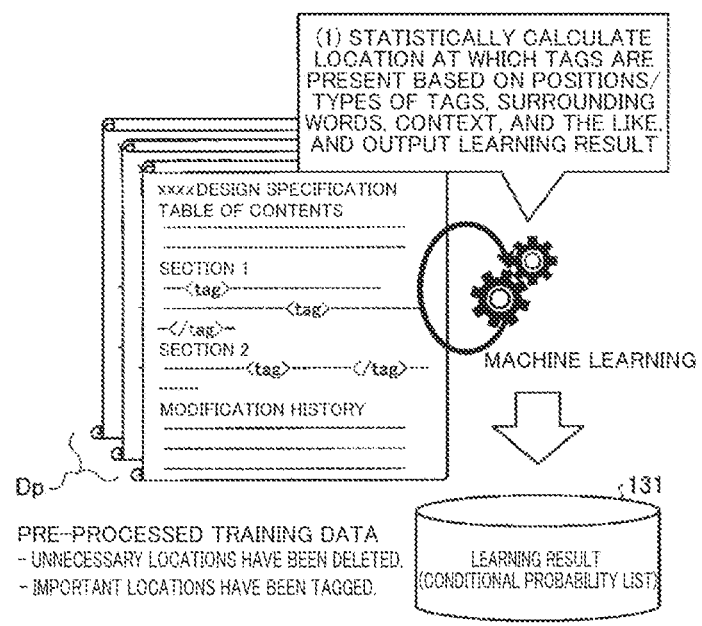
FIG. 3 is a diagram illustrating processing performed by a learning unit shown in FIG. 2.

The learning unit 142 learns the pre-processed training data and generates a conditional probability list for the tagged description portions. FIG. 3 is a diagram illustrating processing performed by the learning unit 142 shown in FIG. 2. As shown in FIG. 3, the learning unit 142 uses pre-processed training data Dp. In the pre-processed training data Dp, description portions that are not needed for learning have been deleted and important portions have been tagged. Based on the positions, types, surrounding words, and context of the tags in the pre-processed training data Dp, the learning unit 142 statistically calculates portions with tags and outputs a conditional probability list 131, which is the learning result (see (1) in FIG. 3). The learning unit 142 performs learning using machine learning logic such as CRF, for example. The conditional probability list 131 is stored in the storage unit 13.

Figure 4:
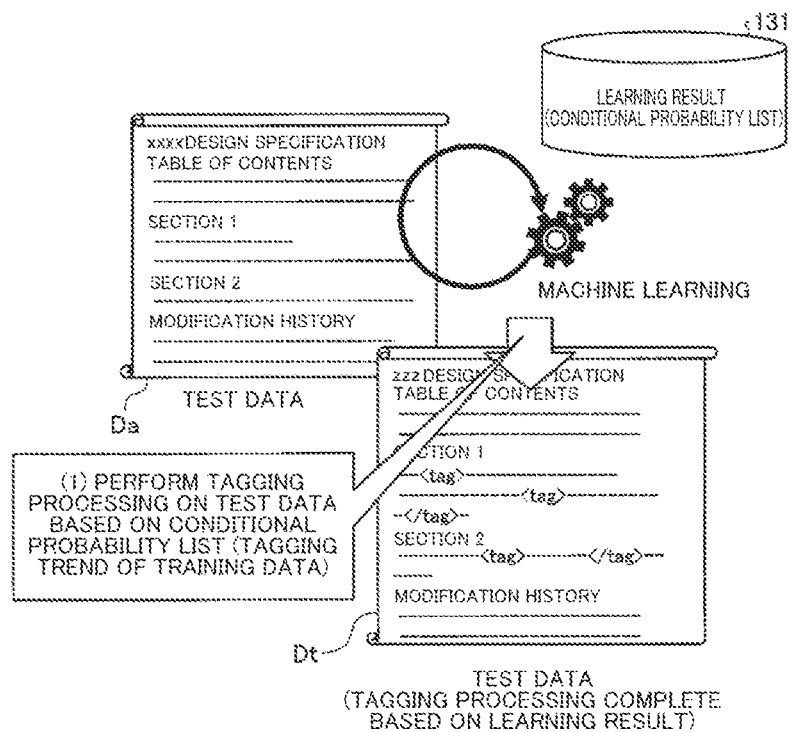
FIG. 4 is a diagram illustrating processing performed by a tagging unit shown in FIG. 2.

The tagging unit 143 tags the description content of the test data based on the conditional probability list 131. FIG. 4 is a diagram illustrating processing performed by the tagging unit 143 shown in FIG. 2. As shown in FIG. 4, the tagging unit 143 performs tagging processing on the test data Da based on the conditional probability list 131 (tagging trend of training data) (see (1) in FIG. 45. The tagging unit 143 performs tagging processing using machine learning logic such as CRF, for example. The tagging unit 143 generates test data Dt that has been tagged.

The test item extraction unit 144 mechanically extracts test items from the description content of the tagged test data.

The output unit 15 is realized by, for example, a display apparatus such as a liquid crystal display, a printing apparatus such as a printer, or an information communication apparatus. The output unit 15 outputs the test item data Di indicating the test items extracted by the test item extraction unit 144 from the test data Da to a testing apparatus or the like.

Flow of Learning Processing

Figure 5:
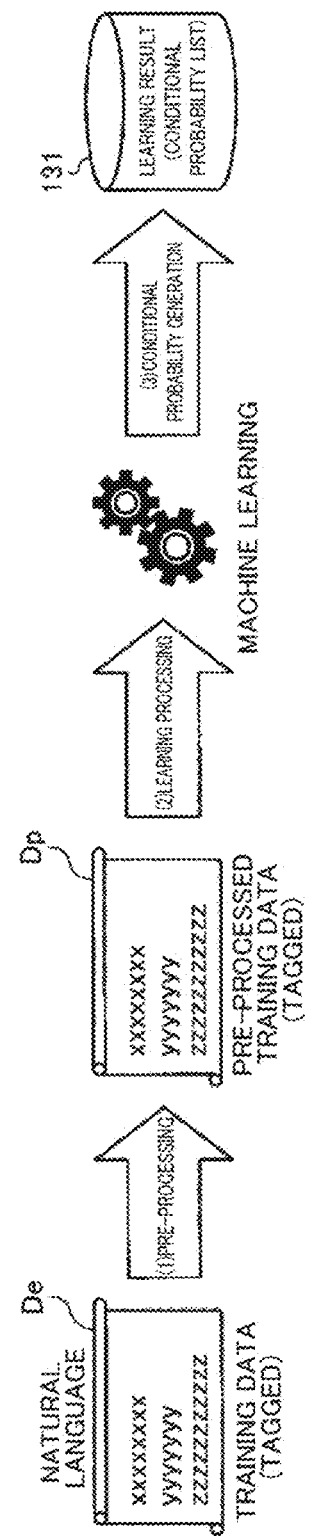
FIG. 5 is a diagram illustrating learning processing performed by the extraction apparatus shown in FIG. 2.

Next, learning processing in the processing performed by the extraction apparatus 10 will be described. FIG. 5 is a diagram showing learning processing performed by the extraction apparatus 10 shown in FIG. 2.

First, as shown in FIG. 5, when the extraction apparatus 10 receives input of the tagged training data De, the pre-processing unit 141 performs pre-processing for deleting description portions with low relevance to the tags from the training data De (see (1) in FIG. 5). Then, the learning unit 142 performs learning processing for learning the pre-processed training data Dp using machine learning logic (see (2) in FIG. 5) and generates a conditional probability list (see (3) in FIG. 5).

Figure 6:
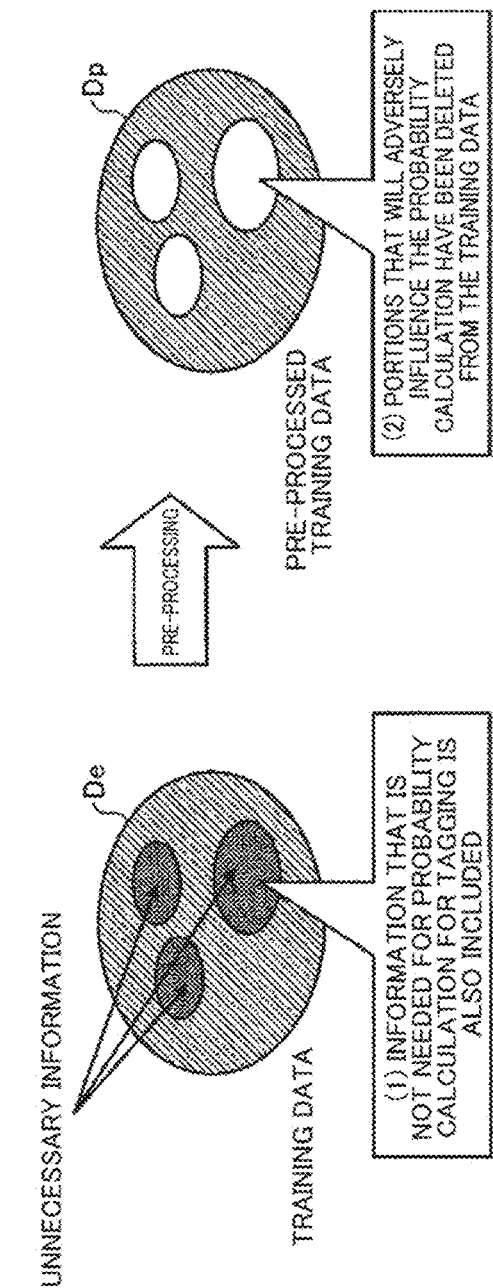
FIG. 6 is a diagram illustrating training data before and after pre-processing.

FIG. 6 is a diagram illustrating the training data before and after pre-processing. As shown in FIG. 6, although information that is not needed for the probability calculation for tagging is also included in the input training data De (see (1) in FIG. 6), the pre-processing unit 141 performs pre-processing for deleting the description portions with low relevance to the tags (see (2) in FIG. 6).

For this reason, the learning unit 142 performs learning using the training data Dp in which portions that will adversely influence the probability calculation have been excluded, and therefore it is possible to perform probability calculation reflecting only the description portions with high relevance to the tags. As a result, compared to the case of learning the training data De as-is, the extraction apparatus 10 can improve the accuracy of machine learning and can generate a more accurate conditional probability list 131.

Flow of Testing Processing

Figure 7:
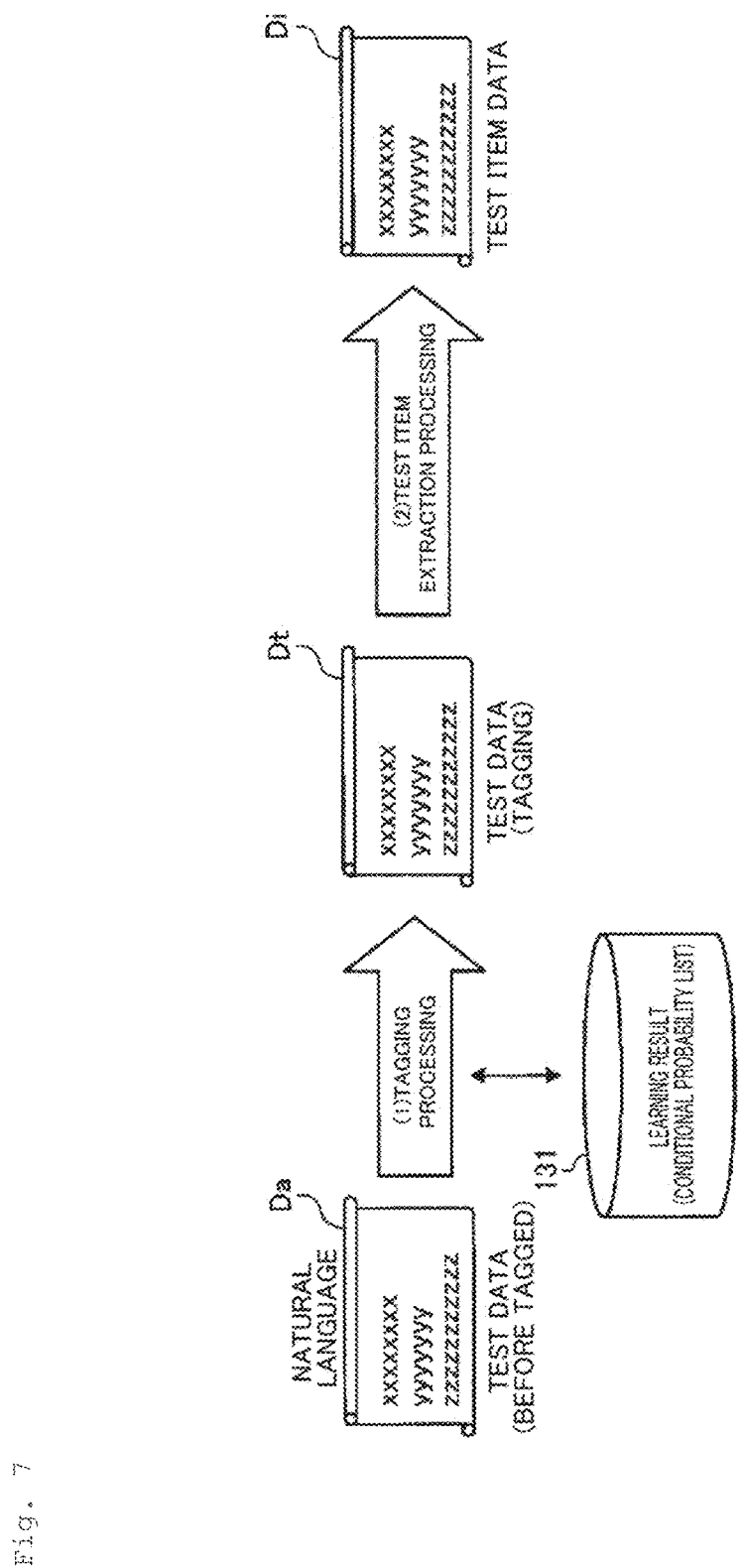
FIG. 7 is a diagram illustrating learning processing performed by the extraction apparatus shown in FIG. 2.

Next, testing processing in the processing performed by the extraction apparatus 10 will be described. FIG. 7 is a diagram illustrating testing processing performed by the extraction apparatus shown in FIG. 2.

As shown in FIG. 7, with the extraction apparatus 10, when test data Da from which test items are to be extracted is input, the tagging unit 143 performs tagging processing for tagging the description content of the test data based on the conditional probability list 131 (see (1) in FIG. 7). The test item extraction unit 144 of the extraction apparatus 10 performs test item extraction processing for mechanically extracting the test items from the description content of the tagged test data Dt (see (2) in FIG. 7), and generates the test item data Di.

Processing of Information Gain Calculation Unit

Next, processing performed by the information gain calculation unit 1411 will be described. The information gain calculation unit 1411 calculates an information gain IG(i) using the following Formula (1).

Formula 1

$$IG(i) = H(m) - \{P(X_i=1)H(m|X_i=1) + P(X_i=0)H(m|X_i=0)\} \quad (1)$$

In Formula (1), messages whose occurrence probabilities are $(P_1, P_2, \ldots, P_n)$ are denoted as $(m_1, m_2, \ldots, m_n)$. $X_i$ is a condition, where $X_i=0$ is within tags and $X_i=1$ is outside of tags. Also, entropy H(m) is indicated by Formula (2) below.

[Formula 2]

$$H(m) = \sum_{i=1}^{n} P_i I_i = -\sum_{i=1}^{n} P_i \log P_i \quad (2)$$

The first term on the right side of Formula (1) indicates the entropy of the occurrence of any word m in a sentence. P(m) indicates a probability that any word m will occur in a sentence. Also, the second term on the right side of Formula (1) indicates the entropy of co-occurrence of a premise $X_i$ and a word m. $P(X_i)$ indicates the probability of being within or outside of tag, and $H(m|X_i)$ indicates the entropy of the occurrence of any word m within or outside of a tag.

A large information gain can be said to reduce entropy. That is, a word with a large information gain is thought, to have a high degree of relevance to the tag.

Next, an information gain calculation procedure will be described. First, a case will be described in which the information gain calculation unit 1411 calculates the entropy H(m) of a word m.

First, as first processing, the information gain calculation unit 1411 counts the total number X of words in the document. As an example of counting, text A obtained by morphologically analyzing a document is prepared, and the information gain calculation unit 1411 counts a word count G based on the text A.

Next, as second processing, the information gain calculation unit 1411 counts an appearance count Y of a word y in the document. As an example of counting, the appearance count Y in the text A is counted for the word y.

Then, as third processing, the information gain calculation unit 1411 calculates $P_i$ using Formula (3) based on the numbers obtained in the first processing and the second processing.

[Formula 3]

$$P_i = \frac{Y}{G} \quad (3)$$

As fourth processing, the information gain calculation unit 1411 calculates the entropy H(m) based on the result obtained in the third processing and based on Formula (2).

Next, a case will be described in which the information gain calculation unit 1411 calculates the entropy $H(m|X_i)$ of the word m during the condition $X_i$.

First, as fifth processing, the information gain calculation unit 1411 counts the appearance count Y of the word m within the tags $X_i=0$. As an example of counting, the text A. and a text b obtained by extracting only tagged rows from text A are prepared, and the information gain calculation unit 1411 counts the word count W of the text B and counts the appearance count Z in the text B for the word m in the text A.

Here, the conditional probability $P(m|X_i)$ is indicated as in Formula (4).

[Formula 4]

$$P(m \mid X_1 = 0) = \frac{P(m \cap X_i)}{P(X_i)} \quad (4)$$

Then, $P(X_i=0)$ in Formula (4) is indicated (5), and $P(m \cap X_i)$ is indicated by Formula (6).

[Formula 5]

$$P(X_i = 0) = \frac{W}{G} \quad (5)$$

[Formula 6]

$$P(m \cap X_i) = \frac{Z}{G} \quad (6)$$

Accordingly, Formula (4) is indicated as in Formula (7).

[Formula 7]

$$P(m \mid X_i = 0) = \frac{Z}{W} \quad (7)$$

As sixth processing, the information gain calculation unit 1411 calculates the entropy $H(m|X_i)$ based on Formula (2) and $P(m|X_i=0)$ obtained by applying the counted W and Z to Formula (7). Then, the Information gain calculation unit 1411 applies the calculation result of the fourth processing and the calculation result of the sixth processing to Formula (1) to obtain the information gain IG(i).

Processing of Deletion Unit

Next, processing performed by the deletion unit 1412 will be described. Based on the information gain of each word calculated by the information gain calculation unit 1411, the deletion unit 1412 obtains the description portions with low relevance to the tags and deletes them from the training data De. FIGS. 3 to 10 are diagrams illustrating processing performed by the deletion unit 1412 shown in FIG. 2.

Specifically, the deletion unit 1412 deletes words for which the information gain calculated by the information gain calculation unit 1411 is lower than a predetermined threshold value from the training data. For example, when the information gain calculation unit 1411 calculates the information gain for each word of the training data De (see (1) in FIG. 8), if the value of the information gain is lower than a pre-set threshold value for a word, the deletion unit 1412 sets that word as a deletion target and deletes it from the training data De1 (see (2) in FIG. 8). Then, the deletion unit 1412 changes the threshold value (see (3) in FIG. 8), determines whether or not each word is a deletion target, and deletes the words that are deletion targets.

Figure 8:
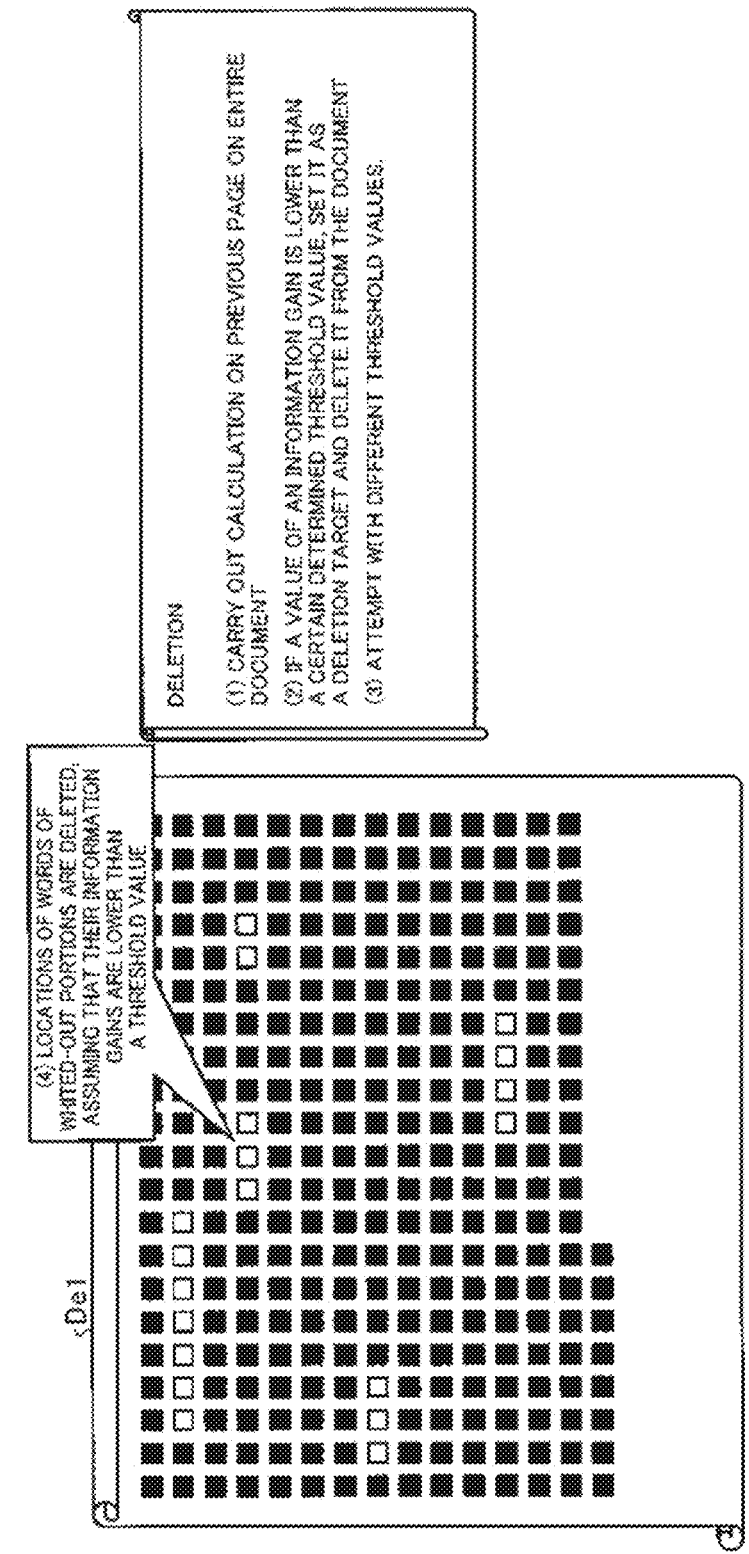
FIG. 8 is a diagram illustrating processing performed by a deletion unit shown in FIG. 2.

In the case of the training data De1 shown in FIG. 8, each box represents a word, and if the box is blackened, the value of the information gain of that word is greater than or equal to the threshold value, and if the box is whited out, the value of the information gain of that word is less than the threshold value. The deletion unit 1412 deletes the words of the whited-out portions among the words of the training data De1 from the training data De1.

Also, the deletion unit 1412 determines whether or not to perform deletion in units of sentences based on the information gain calculated by the information gain calculation unit 1411 and the information gain of a predetermined part of speech in the sentence. Specifically, the deletion unit 1412 deletes sentences that do not include nouns for which the information gain calculated by the information gain calculation unit 1411 is higher than a predetermined threshold value from the training data.

Words with high information gains and words with low information gains are both included in the training data De. Also, words that are common among sentences, such as "desu" and "masu", and technical terms are both included in the training data De in some cases. In view of this, the deletion unit 1412 considers nouns for which the information gain is higher than a predetermined threshold value to be technical terms, determines that sentences that do not include nouns for which the information gain is higher than a predetermined threshold have no relevance to the tag, and deletes those sentences.

Figure 9:
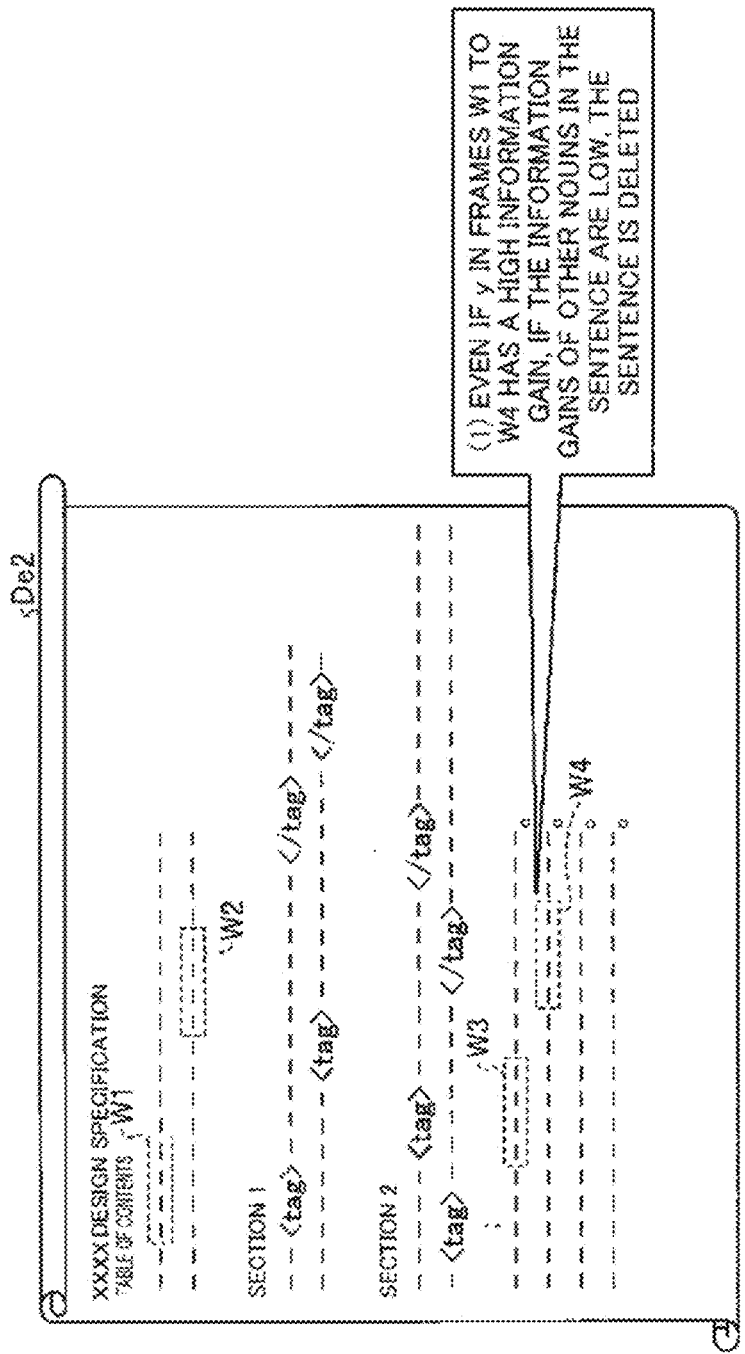
FIG. 9 is a diagram illustrating processing performed by the deletion unit shown in FIG. 2.

For example, in the case of training data De2 shown in FIG. 9, even if the information gain of a word y in frames W1 to W4 is higher than the threshold value, if the information gains of the other nouns in that sentence are lower than the threshold value, that sentence is deleted (see (1) in FIG. 9). For example, even if the information gain of a word in the frame W1 is higher than the threshold value, if the information gains of the other nouns in the same sentence are lower than the threshold value, the deletion unit 1412 deletes the entire sentence including the words in the frame W1.

Also, the deletion unit 1412 determines whether or not to perform deletion in units of sentences based on the information gain calculated by the information gain calculation unit 1411 and whether or not there is a verb in the sentence. Specifically, the deletion unit 1412 deletes sentences that include nouns for which the information gain calculated by the information gain calculation unit 1411 is higher than a predetermined threshold value but do not include verbs from the training data.

Words with high information gains and words with, low information gains are both included in the table of contents, titles, and the like in the training data De. It can be said that even if there were words with high information gains in the table of contents titles and initial phrases of sections if there is no verb in the corresponding line, the words do not correspond to test, items. For this reason, the deletion unit 1412 determines that sentences that do not include verbs but include nouns for which the information gains calculated by the information gain calculation unit 1411 are higher than the predetermined threshold value are description portions that are not to be tagged, and deletes those sentences from the training data. The deletion unit 1412 also deletes lines including only words with low information gains. Although there is a high likelihood that words with high relevance to the tags will be present in the table of contents and the like it is thought that those words will influence the CRF probability calculation in the original context and therefore the influence on the accuracy of the machine learning logic such as CRF is removed by deleting such sentences.

Figure 10:
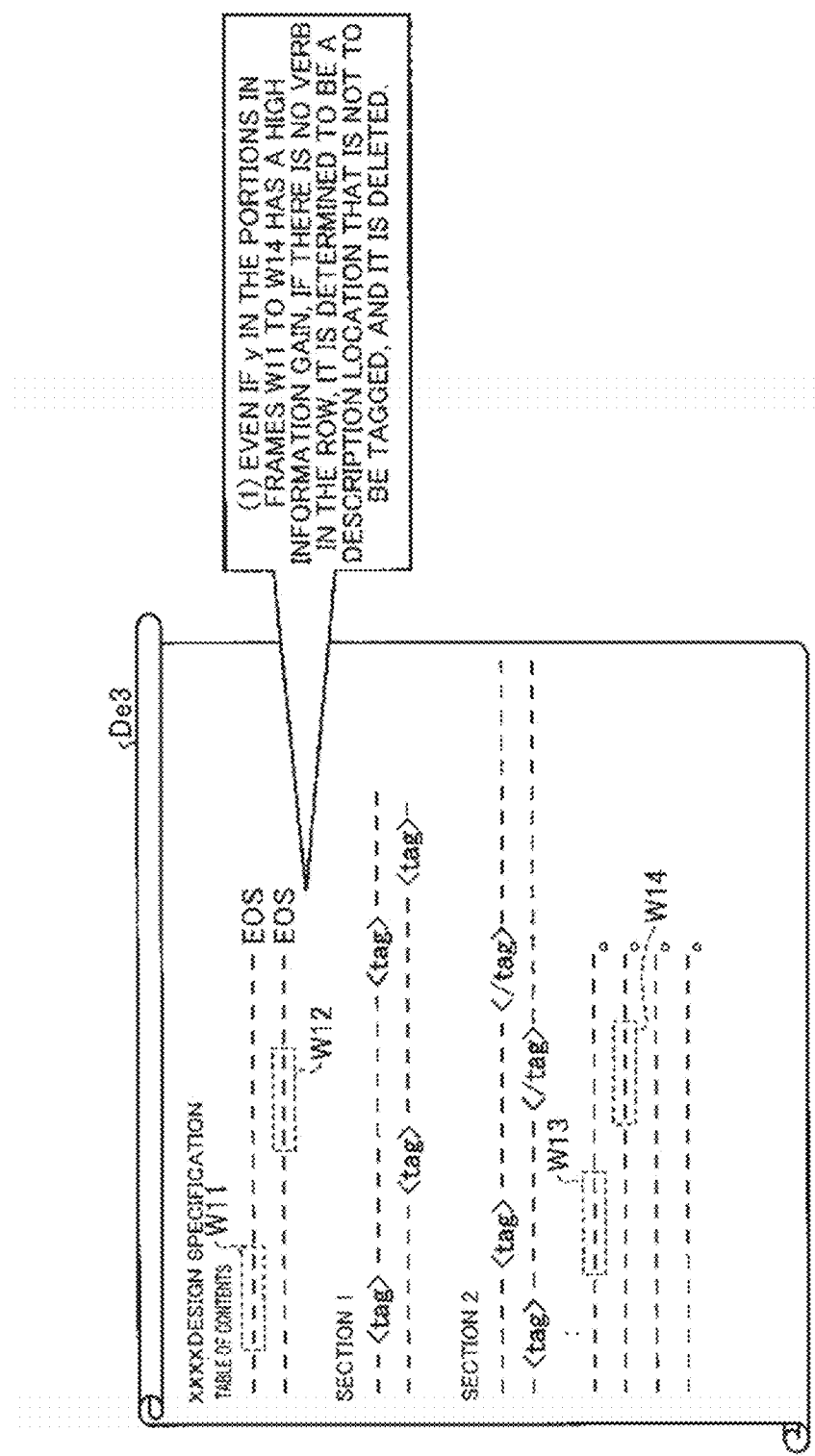
FIG. 10 is a diagram illustrating processing performed by the deletion unit shown in FIG. 2.

In the case of training data De3 in FIG. 10 even if the information gain of the words y in the frames W11 and W12 is higher than the threshold value if there is no verb in the same line the deletion unit 1412 determines it to be a description location that is not to be tagged, and deletes it (see (1) in FIG. 10). For example, even if the information gain of the word in the frame W11 is higher than the threshold value, if there is no verb in the same sentence, the deletion unit 1412 deletes the entire sentence including the word in the frame W11. Note that in order to recognize each row, it is sufficient that an EOS (End of String) or the like that can be confirmed in a text file is used after morphological analysis is performed with Mecab.

Processing Procedure of Learning Processing

Figure 11:
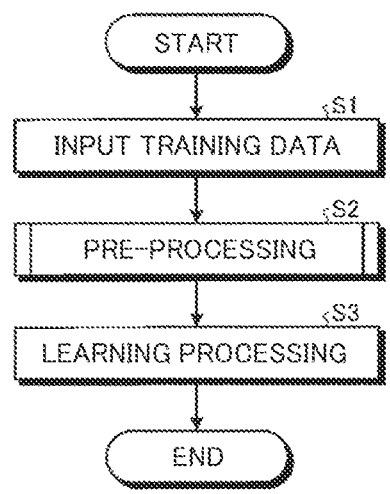
FIG. 11 is a flowchart showing a processing procedure of learning processing performed by the extraction apparatus shown in FIG. 2.

Next, a processing procedure of learning processing in the processing performed by the extraction apparatus 10 will be described. FIG. 11 is a flowchart showing a processing procedure of learning processing performed by the extraction apparatus 10 shown in FIG. 2.

As shown in FIG. 11, with the extraction apparatus 10, upon receiving input of the tagged training data De (step S1), the pre-processing unit 141 performs pre-processing for deleting description portions with low relevance to the tags from the training data De (step S2). Then, the learning unit 142 performs learning processing for learning the pre-processed training data using machine learning logic (step S3), generates a conditional probability list, and stores the generated conditional probability list in the storage unit 13.

Processing Procedure of Pre-Processing

Figure 12:
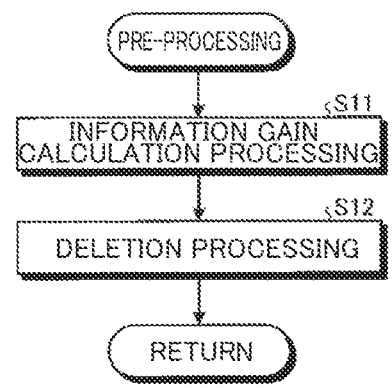
FIG. 12 is a flowchart showing a processing procedure of pre-processing shown in FIG. 11.

A processing procedure of pre-processing (step S2) shown in FIG. 11 will be described. FIG. 12 is a flowchart showing a processing procedure of pre-processing shown in FIG. 11.

As shown in FIG. 12, with the pre-processing unit 141, the information gain calculation unit 1411 performs information gain calculation processing for calculating the information gain for each word in the input training data De (step S11). The deletion unit 1412 obtains the description portions with low relevance to the tags based on the information gain of each word calculated by the information gain calculation unit 1411 and performs deletion processing for deleting the obtained description portions from the training data De (step S12).

Processing Procedure of Testing Processing

Figure 13:
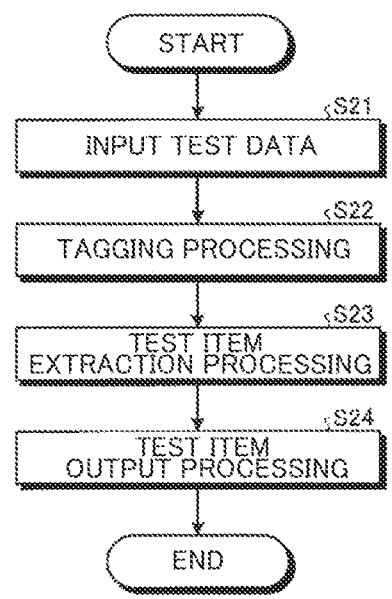
FIG. 13 is a flowchart showing a processing procedure of learning processing performed by the extraction apparatus 10 shown in FIG. 2.

Next, a processing procedure of testing processing in the processing performed by the extraction apparatus 10 will be described. FIG. 13 is a flowchart showing a processing procedure of testing processing performed by the extraction apparatus 10 shown in FIG. 2.

As shown in FIG. 13, with the extraction apparatus 10, when the test data Da, which is a test item extraction target, is input (step S21), the tagging unit 143 performs tagging processing for tagging the description content of the test data based on the conditional probability list 131 (step S22). Next, the test item extraction unit 144 performs test item extraction processing for mechanically extracting test items from the description content of the tagged test data Dt (step S23), and the output unit 15 outputs the test item data Di (step S24).

Effect of the Embodiment

Figure 14:
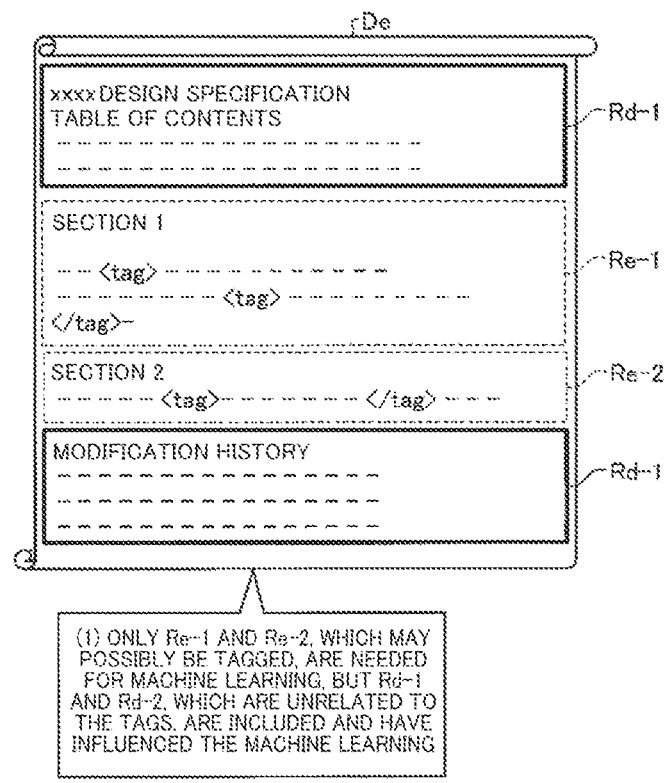
FIG. 14 is a diagram illustrating description content of training data.

FIG. 14 is a diagram illustrating description content of training data. In the training data De, only portions Re-1 and Re-2, which may possibly be tagged, are needed for machine learning, but portions Rd-1 and Rd-2 that are irrelevant to the tags are included (see (1) in FIG. 14). In this manner, since the portions Rd-1 and Rd-2 that are unrelated to the tags are included in the training data De, in the conventional extraction method, those portions have influenced machine learning. In actuality, there have been many errors between test items extracted manually by a stilled person in software development and test items extracted using the conventional automatic extraction method.

In contrast to this, with the extraction apparatus 10 according to the present embodiment, before learning, pre-processing for deleting the description portions with low relevance to the tags from the training data De is performed on the training data De. Also, the learning unit 142 performs learning using the training data Dp in which portions that will adversely influence the probability calculation have been excluded, and therefore it is possible to perform probability calculation reflecting only the description portions with high relevance to the tags.

Also, with the extraction apparatus 10, as pre-processing, information gain indicating the degree of relevance to the tags is calculated for each word in the training data De, description portions with low relevance to the tags are obtained based on the information gain of each word, and the obtained description portions are deleted from the training data De. In this manner, with the extraction apparatus 10, the degree of relevance between the tags and the words is quantitatively evaluated, and training data in which only the degrees of relevance are left is suitably generated.

By learning the pre-processed training data, the extraction apparatus 10 can improve the accuracy of machine learning and can generate a highly-accurate conditional probability list 131 compared to the case of learning the training data as-is. That is, the extraction apparatus 10 can accurately learn the tagged portions in the software development process, and accompanying this, the test items can be efficiently extracted from the test data such as a design specification.

System Configuration, Etc

The constituent elements of the apparatuses shown in the drawings are functionally conceptual, and are not necessarily required to be physically constituted as shown in the drawings. That is, the specific modes of dispersion and integration of the apparatuses are not limited to those shown in the drawings, and all or a portion thereof can be functionally or physically dispersed or integrated in any unit according to various loads, use conditions, and the like. Furthermore, all or any portion of the processing functions performed by the apparatuses can be realized by a CPU and programs analyzed and executed by the CPU, or can be realized as hardware using wired logic.

Also, among the steps of processing described in the present embodiment, all or a portion of the steps of processing described as being executed automatically can also be performed manually, or all or a portion of the steps of processing described as being performed manually can also be performed automatically using a known method. In addition, the processing procedures, control procedures, specific names, various types of data, and information including parameters that were indicated in the above-described document and in the drawings can be changed as appropriate, unless specifically mentioned otherwise.

Program

Figure 15:
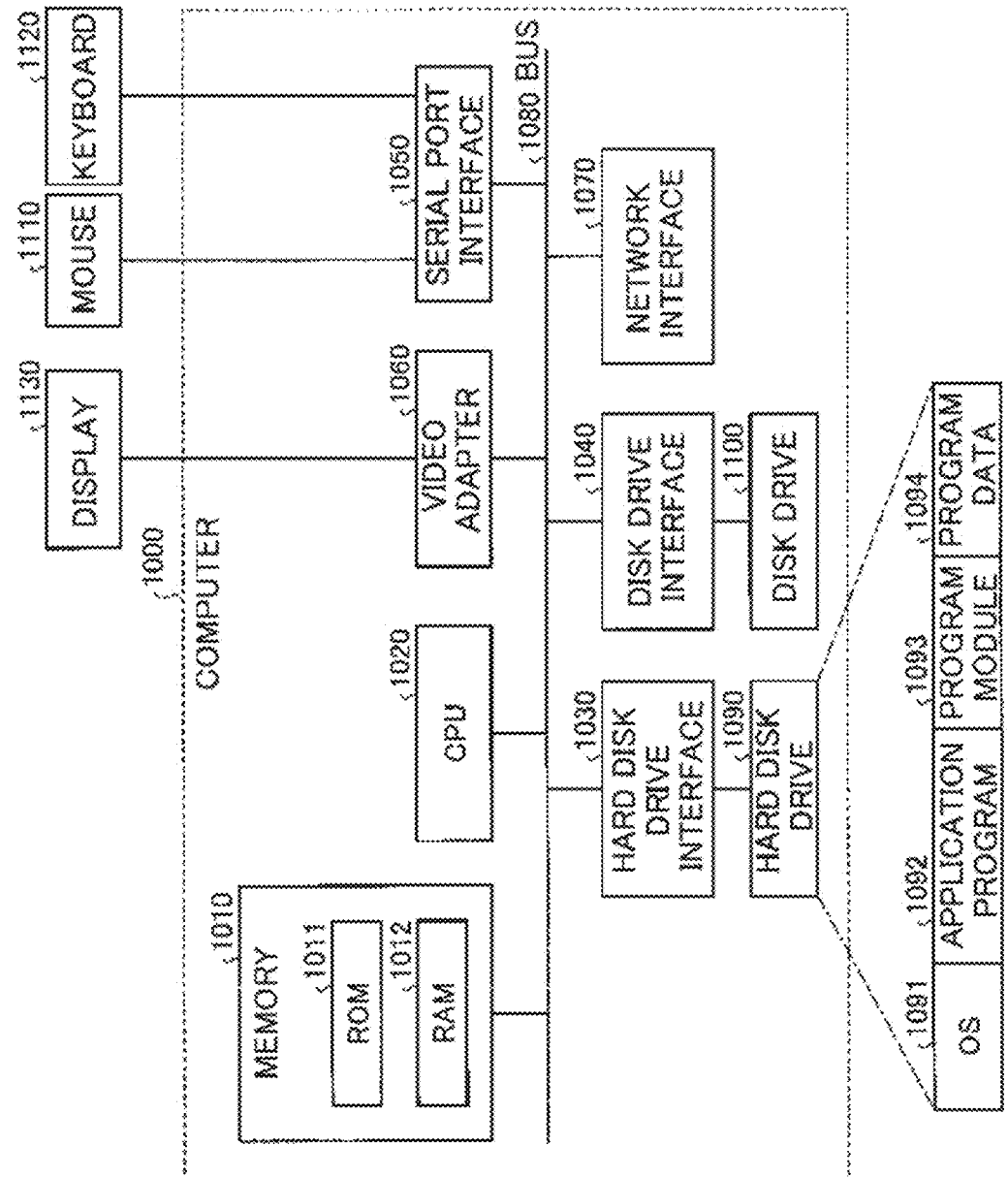
FIG. 15 is a diagram showing an example of a computer in which an extraction apparatus is realized by executing a program.

FIG. 15 is a drawing showing an example of a computer realized by the extraction apparatus 10 due to the program being executed. A computer 1000 includes, for example, a memory 1010 and a CPU 1020. Also, the computer 1000 includes a hard disk drive interface 1030, a disk drive interface 1040, a serial port interface 1050, a video adapter 1060, and a network interface 1070. These units are connected to each other by a bus 1080.

A memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, the display 1130.

The hard disk drive 1090 stores, for example, an OS 1091, an application program 1092, a program module 1093, and program data 1094. That is, a program defining the steps of processing of the extraction apparatus 10 is implemented as the program module 1093 in which code that is executable by the computer 1000 is described. The program module 1093 is stored in, for example, the hard disk, drive 1090. For example, the program module 1093 for executing processing similar to that of the functional configuration of the extraction apparatus 10 is stored in the hard disk drive 1090. Note that the hard disk drive 1090 may also be replaced by an SSD.

Also, setting data that is to be used in the processing of the above-described embodiment is stored in, for example, the memory 1010 or the hard disk drive 1090 as the program data 1094. Also, the CPU 1020 reads the program module 1093 and the program data 1094 stored in the memory 1010 and the hard disk drive 1090 to RAM 1012 and executes them as needed.

Note that the program module 1093 and the program data 1094 are not limited to being stored in the hard disk drive 1090, and may also be stored in, for example, a removal storage medium and be read by the CPU 1020 via the disk drive 1100 or the like. Alternatively, the program module 1093 and the program data 1094 may also be stored in another computer connected via a network (LAN, WAN, etc.). Also, the program module 1093 and the program data 1094 may also be read from another computer by the CPU 1020 via the network interface 1070.

Although an embodiment in which the invention achieved by the inventor is applied was described above, the present invention is not limited by the descriptions and drawings forming a portion of the disclosure of the present invention according to the present, embodiment. That is, other embodiments, working examples, operation techniques, and the like achieved based on the present embodiment by a person skilled in the art are all included in the scope of the present invention.

REFERENCE SIGNS LIST

10 Extraction apparatus
11 Input unit
12 Communication unit
13 Storage unit
14 Control unit
15 Output unit
141 Pre-processing unit
142 Learning unit
143 Tagging unit
144 Test item extraction unit
1411 Information gain calculation unit
1412 Deletion unit
De Training data
Da Test data
Di Test item data

The invention claimed is:

1. A learning apparatus comprising one or more processors configured to perform operations comprising:
   obtaining training data that includes a plurality of description portions of a natural language document and a plurality of tags, wherein each description portion includes a set of words and each description portion is associated with a tag that was provided to the description portion in advance;
   calculating an information gain for each word included in the training data that indicates a degree of relevance of the word to the plurality of tags for the word;
   deleting, from the training data, words whose degrees of relevance do not satisfy a threshold to obtain pre-processed training data;
   learning the pre-processed training data and the information gain for each word that indicates the degree of relevance of the word to the plurality of tags;
   generating a list of conditional probabilities indicating a trend for attaching the plurality of description portions with the plurality of tags;
   receiving test data;
   tagging, based on the list of conditional probability, description content of the test data by attaching a tag, included in the plurality of tags, to a corresponding portion of the description content;
   extracting a test item from the test data based on the tagged description content; and
   outputting the test item into a testing apparatus for testing.

2. The learning apparatus according to claim 1, wherein the operations comprise:
   deleting a sentence that does not include a noun for which the information gain is higher than a predetermined threshold value from the training data.

3. The learning apparatus according to claim 1, wherein the operations comprise:
   deleting a sentence that does not include a verb but that includes a noun for which the information gain is higher than a predetermined threshold value from the training data.

4. An extraction apparatus comprising one or more processors configured to perform operations comprising:
   obtaining training data that includes a plurality of description portions of a natural language document and a plurality of tags, wherein each description portion includes a set of words and each description portion is associated with a tag that was provided to the description portion in advance;
   calculating an information gain for each word included in the training data that indicates a degree of relevance of the word to the plurality of tags for the word;
   deleting, from the training data, words whose degrees of relevance do not satisfy a threshold to obtain pre-processed training data;
   learning the pre-processed training data and the information gain for each word that indicates the degree of relevance of the word to the plurality of tags;
   generating a list of conditional probabilities indicating a trend for attaching the plurality of description portions with the plurality of tags;
   receiving test data;

tagging, based on the list of conditional probability, description content of the test data by attaching a tag, included in the plurality of tags, to a corresponding portion of the description content;

extracting a test item from the test data based on the attached tags of the description content; and outputting the test item into a testing apparatus for testing.

5. A learning method to be executed by a learning apparatus, the learning method comprising:

obtaining training data that includes a plurality of description portions of a natural language document and a plurality of tags, wherein each description portion includes a set of words and each description portion is associated with a tag that was provided to the description portion in advance;

calculating an information gain for each word included in the training data that indicates a degree of relevance of the word to the plurality of tags for the word;

deleting, from the training data, words whose degrees of relevance do not satisfy a threshold to obtain pre-processed training data;

learning the pre-processed training data and the information gain for each word that indicates the degree of relevance of the word to the plurality of tags;

generating a list of conditional probabilities indicating a trend for attaching the plurality of description portions with the plurality of tags;

receiving test data;

tagging, based on the list of conditional probability, description content of the test data by attaching a tag, included in the plurality of tags, to a corresponding portion of the description content;

extracting a test item from the test data based on the tagged description content; and outputting the test item into a testing apparatus for testing.

\* \* \* \* \*